April 7, 1925.  1,532,633
W. NOBLE ET AL
ROADWAY
Filed Nov. 3, 1924
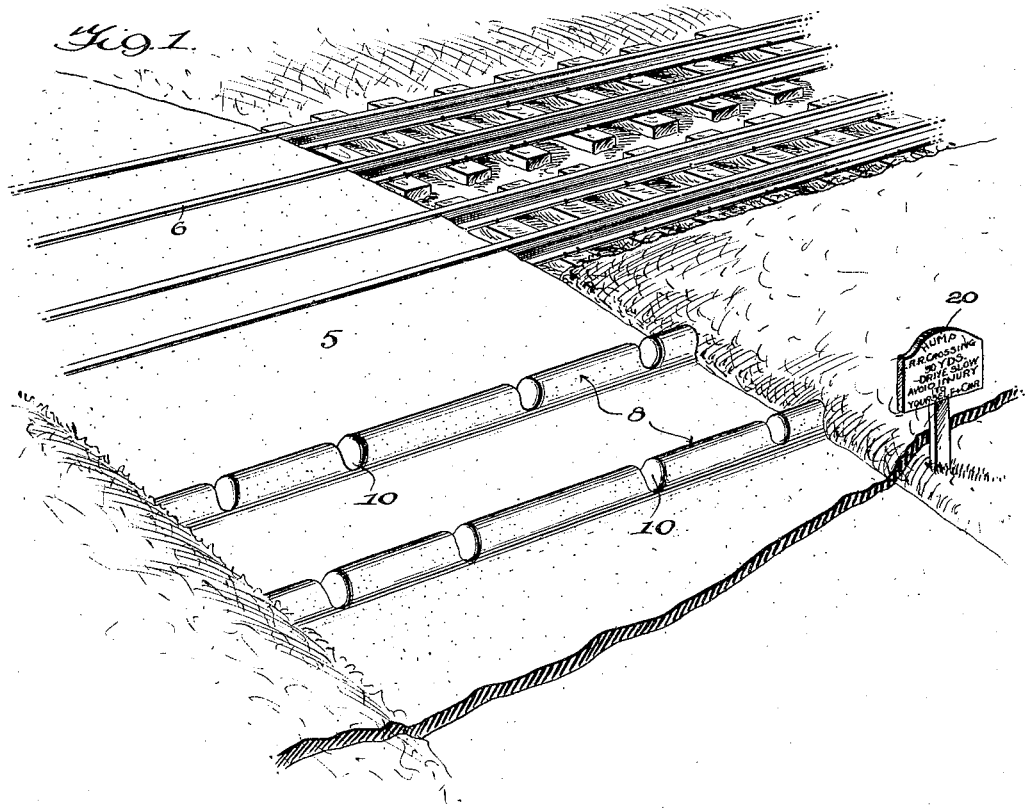
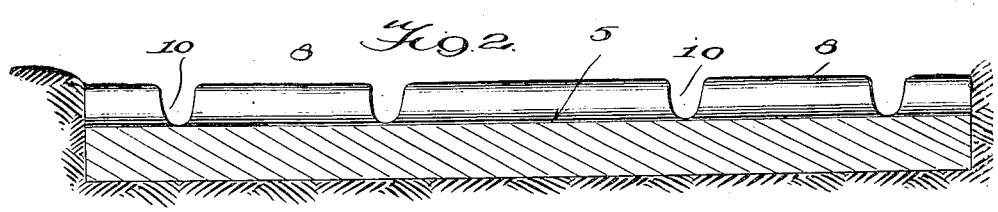
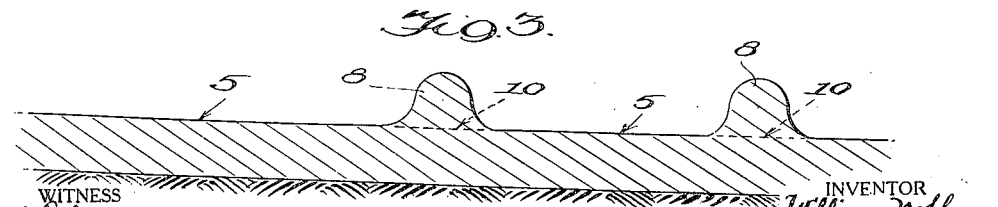
INVENTOR
William Noble
William Kennedy
BY Milo B. Stevens & Co.
ATTORNEYS Patented Apr. 7, 1925.

1,532,633

UNITED STATES PATENT OFFICE.

WILLIAM NOBLE AND WILLIAM KENNEDY, OF FORT DODGE, IOWA.

ROADWAY.

Application filed November 3, 1924. Serial No. 747,576.

*To all whom it may concern:*

Be it known that we, WILLIAM NOBLE and WILLIAM KENNEDY, citizens of the United States, residing at Fort Dodge, in the county of Webster and State of Iowa, have invented new and useful Improvements in Roadways, of which the following is a specification.

This invention relates to roadways and has for an important object the provision of simple and reliable means to warn a vehicle driver of a railway crossing or other place in the road where caution is required.

Briefly stated, the invention forming the subject matter of this application consists in one or more obstructions extending across the road and having recesses or channels for the passage of vehicle wheels, and it will be seen that the operator of the vehicle can guide the wheels of the vehicle in the channels only when driving at a slow and cautious speed.

A further object of the invention is to provide a roadway having warning means of the character specified which is economically maintained and which will seriously jolt the occupants of a vehicle traveling at an excessive rate of speed when approaching the railway crossing.

Other objects and advantages will be apparent during the course of the following description.

In the accompanying drawing forming a part of this application and in which like numerals are employed to designate like parts throughout the same—

Figure 1 is a perspective of a roadway constructed in accordance with this invention;

Figure 2 is a transverse sectional view through the roadway;

Figure 3 is a longitudinal sectional view through the roadway.

In the drawing, wherein for the purpose of illustration is shown a preferred embodiment of the invention, the numeral 5 designates a roadway across which the railroad tracks 6 may extend. Or the intersection in the road may be in the nature of a cross road. Also the invention forming the subject matter of this application is also capable of use in warning the occupants of a vehicle of a curve or other place in the roadway requiring caution on the part of the operator of the vehicle.

In carrying out the invention the roadway is provided with a transverse ridge 8 of a suitable height and width and preferably extending entirely across the road. The ridge may be provided with a plurality of pairs of channels 10 slightly wider than the width of an automobile tire so that when the automobile is traveling at a reasonable or cautious rate of speed the wheels may be easily guided through the channels. The transverse ridge 8 is located a suitable distance at one side of the railway crossing or the like so that if the occupants of the vehicle approach the railway crossing at an excessive rate of speed they will be severely jolted and the automobile will possibly be damaged. It will be seen with reference to Fig. 1 that more than one ridge may be provided at each side of the crossing or other dangerous place in the road. Furthermore, the arrangement of the channels is such that vehicles passing each other will be spaced a proper distance apart.

A suitable warning signal 20 may be located a suitable distance in advance of the ridge or ridges 8 to warn the operators of all vehicles of the presence of the obstruction in the road.

It will be seen that the invention forming the subject matter of this invention forms a reliable means for slowing down traffic at railroad crossings and imposes no hardship on the vehicle operators who approach the railroad crossing at the proper speed.

Having thus described the invention, what is claimed is:

1. A roadway having a transverse ridge in the path of travel of vehicles to warn the operators of the vehicles of a dangerous place in the road, said ridge being provided with channels for the passage of the wheels of the vehicles.

2. A roadway having a transverse ridge in the path of travel of vehicles to warn the operators of the vehicles of a dangerous place in the road, said ridge being provided with channels for the passage of the wheels of the vehicles, and means at a point remote from the ridge to warn the vehicle operators of the presence of the ridge.

3. A roadway having a transverse ridge in the path of travel of vehicles to warn the operators of the vehicles of a dangerous place in the road, said ridge being provided with channels for the passage of the wheels of the vehicles, and means at a point remote from the ridge to warn the vehicle operators of the presence of the ridge, said ridge being extended entirely across the roadway.

In testimony whereof we affix our signatures.

WILLIAM NOBLE.
WILLIAM KENNEDY.